US011159497B2

(12) United States Patent
Smelov (10) Patent No.: US 11,159,497 B2
(45) Date of Patent: Oct. 26, 2021

(54) SECURE MESSAGE PASSING USING SEMI-TRUSTED INTERMEDIARIES (71) Applicant: Citrix Systems, Inc., Ft. Lauderdale, FL (US)

(72) Inventor: Alexandr Smelov, North Lauderdale, FL (US)

(73) Assignee: Citrix Systems, Inc., Ft. Lauderdale, FL (US)

(*) Notice: Subject to any disclaimer, the term of this patent is extended or adjusted under 35 U.S.C. 154(b) by 39 days.

(21) Appl. No.: 16/775,901

(22) Filed: Jan. 29, 2020

(65) Prior Publication Data
US 2021/0234845 A1 Jul. 29, 2021

(51) Int. Cl.
H04L 29/06 (2006.01)
H04L 12/58 (2006.01)

(52) U.S. Cl.
CPC ........ *H04L 63/0435* (2013.01); *H04L 51/046* (2013.01); *H04L 63/0442* (2013.01)

(58) Field of Classification Search
CPC ... H04L 63/0435; H04L 9/0825; H04L 29/06; H04L 9/08; H04L 9/0618; H04L 51/00; H04L 67/147; H04L 63/0428; H04L 9/00; H04L 63/0478; H04L 63/0471; H04L 9/0822; G06Q 30/0251; G06Q 20/40975; G06C 20/40975; G06F 21/6209; G06F 9/546; G06F 2211/008; G05F 2211/008
See application file for complete search history.

(56) References Cited

U.S. PATENT DOCUMENTS 6,697,942 B1* 2/2004 L'Heureux ............. H04L 51/18
380/238
7,096,355 B1* 8/2006 Marvit ................ H04L 63/0428
380/264

(Continued)

FOREIGN PATENT DOCUMENTS

GB 2568966 6/2019

OTHER PUBLICATIONS

Merkle et al., "On the Security of Multiple Encryption", 1981 (Year: 1981).*

(Continued)

*Primary Examiner* — Ondrej C Vostal
(74) *Attorney, Agent, or Firm* — Finch & Maloney PLLC (57) ABSTRACT Techniques are provided for secure message passing. A sender process has a clear (non-encrypted) text message to pass to a recipient process as an encrypted message. The sender generates a message encryption key (MEK) for encrypting the message and sends the MEK to a first intermediary process, which encrypts the MEK. The sender uses the MEK to encrypt the message and passes both the encrypted message and the encrypted MEK to a second intermediary process. The second intermediary verifies that the sender is authorized to send messages and retains the encrypted message and the encrypted MEK. The second intermediary passes the encrypted message and the encrypted MEK to the recipient, which requests decryption of the encrypted MEK from the first intermediary. The first intermediary then decrypts the MEK and returns it to the recipient. Finally, the recipient decrypts the message using the MEK.

20 Claims, 6 Drawing Sheets

(56) References Cited

U.S. PATENT DOCUMENTS

| | | | | |
|---|---|---|---|---|
| 7,564,977 B2* | 7/2009 | Marino | | H04L 9/0827 380/277 |
| 7,949,138 B2* | 5/2011 | Schwartz | | H04L 9/3271 380/286 |
| 8,503,681 B1* | 8/2013 | McGrew | | H04L 63/065 380/281 |
| 8,769,260 B1* | 7/2014 | Kwan | | H04L 63/0471 713/153 |
| 10,298,551 B1* | 5/2019 | Perlman | | H04L 63/0428 |
| 2003/0061481 A1* | 3/2003 | Levine | | H04L 9/0836 713/163 |
| 2004/0034772 A1* | 2/2004 | Alao | | H04L 9/302 713/168 |
| 2004/0139314 A1* | 7/2004 | Cook | | H04L 63/0823 713/151 |
| 2005/0081039 A1* | 4/2005 | Lee | | H04L 9/3263 713/176 |
| 2005/0251491 A1* | 11/2005 | Medina | | H04L 63/0464 705/71 |
| 2006/0095771 A1* | 5/2006 | Appenzeller | | H04L 9/083 713/171 |
| 2007/0269041 A1* | 11/2007 | Bhatnagar | | H04L 9/0825 380/30 |
| 2008/0162527 A1* | 7/2008 | Pizano | | G06Q 30/0251 |
| 2009/0177885 A1* | 7/2009 | Kubota | | H04N 21/4135 713/168 |
| 2009/0178115 A1* | 7/2009 | Fiske | | G06F 21/32 726/2 |
| 2010/0211787 A1* | 8/2010 | Bukshpun | | H04L 9/065 713/170 |
| 2011/0280382 A1* | 11/2011 | Mairs | | H04M 1/72436 379/93.01 |
| 2013/0283039 A1* | 10/2013 | Jevans | | H04L 63/0435 713/153 |
| 2015/0180845 A1* | 6/2015 | Uomini | | H04L 63/083 726/3 |
| 2015/0349958 A1* | 12/2015 | Lindell | | H04L 9/3228 713/168 |
| 2019/0068614 A1* | 2/2019 | Bhatnagar | | H04L 9/08 |
| 2019/0306706 A1* | 10/2019 | Zhang | | H04W 12/0431 |
| 2020/0007502 A1* | 1/2020 | Everton | | H04L 51/063 |
| 2020/0036735 A1* | 1/2020 | Canard | | H04L 63/1416 |
| 2021/0044435 A1* | 2/2021 | Patureau Mirand | | H04L 9/3228 |

OTHER PUBLICATIONS

International Search Report and Written Opinion dated Jan. 25, 2021 for International Patent Application No. PCT/US2020/059670, 15 pages.

* cited by examiner

FIG. 7

SECURE MESSAGE PASSING USING SEMI-TRUSTED INTERMEDIARIES

BACKGROUND

Passing messages securely between two or more computing devices is often necessary when the message includes sensitive or confidential information. In some circumstances, a sender of a message cannot send a message directly to a recipient because the address or location of the recipient is unknown or because the recipient is otherwise unreachable. In such cases, the sender can pass the message to an intermediary, which temporarily holds the message until the recipient retrieves it. When passing the message to the intermediary, the sender can indicate the identity of the recipient authorized to receive the message, so that the intermediary can ensure the message is passed to its proper recipient. Subsequently, the recipient can request messages from the intermediary. Once the intermediary verifies the identity of the recipient vis-à-vis the identity previously indicated by the sender, the intermediary passes the message to the recipient, and the recipient processes the message.

In some systems, the intermediary is trusted with an unencrypted message. In other systems, the sender encrypts the message prior to passing the message to the intermediary. In systems where the sender encrypts the message, the processing executed by the recipient can include decryption of the message to access it contents.

SUMMARY

One example embodiment provides a method including receiving, by a first intermediary computing device, a first encryption key generated by a sender computing device for encrypting a message located at the sender computing device. The message is to be passed between the sender computing device and a recipient computing device via a second intermediary device that is separate, independent, and distinct from the first intermediary computing device. The method further includes encrypting, by the first intermediary computing device, the first encryption key using a second encryption key located at the first intermediary computing device to produce an encrypted version of the first encryption key. The method further includes sending, by the first intermediary computing device, the encrypted version of the first encryption key to the sender computing device for inclusion with the message. The method further includes receiving, by the first intermediary computing device, the encrypted version of the first encryption key from the recipient computing device. The method further includes decrypting, by the first intermediary computing device, the encrypted version of the first encryption key using the second encryption key located at the first intermediary computing device to produce a decrypted version of the first encryption key. The method further includes sending, by the first intermediary computing device, the decrypted version of the first encryption key to the recipient computing device for decrypting the message. In some cases, the method includes digitally signing, by the first intermediary computing device, the encrypted version of the first encryption key. In some cases, the method includes receiving, by the first intermediary computing device, the digitally signed and encrypted version of the first encryption key from the recipient computing device, and verifying that the recipient computing device is authorized to request decryption of the encrypted version of the first encryption key based on a recipient identifier ("RID") associated with the recipient computing device prior to decrypting the encrypted version of the first encryption key. In some cases, the method includes digitally signing, by the first intermediary computing device, the encrypted version of the first encryption key and the RID. In some cases, the method includes receiving, by the second intermediary computing device and from the sender computing device, the encrypted version of the first encryption key and a message encrypted by the sender computing device using the first encryption key; receiving, by the second intermediary computing device, a request to pass the encrypted message and the encrypted version of the first encryption key to the recipient computing device; and passing, by the second intermediary computing device and to the recipient computing device, the encrypted version of the first encryption key and the message encrypted by the sender computing device using the first encryption key. In some cases, the method includes verifying, by the intermediary computing device, that the sender computing device is authorized to request encryption of the first encryption key in response to receiving the first encryption key from the sender computing device. In some cases, the first encryption key is encrypted using a symmetric encryption process. In some cases, the first encryption key is encrypted using an asymmetric encryption process.

Another example embodiment provides a method including receiving, by a second intermediary computing device, an encrypted message to be passed between a sender computing device and a recipient computing device. The message is encrypted by the sender computing device using a first encryption key. The method further includes receiving an encrypted version of the first encryption key encrypted by a first intermediary device that is separate, independent, and distinct from the second intermediary computing device. The method further includes receiving, by the second intermediary computing device, a request to pass the encrypted message and the encrypted version of the first encryption key to a recipient computing device. The method further includes passing, by the second intermediary computing device, the encrypted message and the encrypted version of the first encryption key to the recipient computing device, the encrypted version of the first encryption key being encrypted by the first intermediary computing device using a second encryption key located at the first intermediary device. In some cases, the method includes verifying, by the second intermediary computing device, that the recipient computing device is authorized to request passing of the encrypted message to the recipient computing device based on a recipient identifier (RID) associated with the recipient computing device prior to sending the encrypted message to the recipient computing device. In some cases, the method includes receiving, by the first intermediary computing device, the first encryption key used by the sender computing device for encrypting the message; encrypting, by the first intermediary computing device, the first encryption key using the second encryption key located at the first intermediary device to produce the encrypted version of the first encryption key; sending, by the first intermediary computing device, the encrypted version of the first encryption key to the sender computing device for inclusion with the message to be passed to the recipient computing device; receiving, by the first intermediary computing device, the encrypted version of the first encryption key from the recipient computing device subsequent to receipt of the message from the sender computing device; decrypting, by the first intermediary computing device, the encrypted version of the first encryption key using the second encryption key to produce a decrypted version of the first encryption key; and sending, by the intermediary computing device, the decrypted version of the first encryption key to the recipient computing device for decrypting the message. In some cases, the method includes receiving, by the first intermediary computing device, the encrypted version of the first encryption key from the recipient, and verifying that the recipient is authorized to request decryption of the encrypted first encryption key based on a recipient identifier (RID) associated with the recipient computing device prior to decrypting the encrypted MEK. In some cases, the first encryption key is encrypted using a symmetric encryption process. In some cases, the first encryption key is encrypted using an asymmetric encryption process.

Yet another example embodiment provides a system for secure message passing. The system includes a first intermediary including a first memory and at least one first processor coupled to the first memory, where the first intermediary is configured to receive a message encryption key ("MEK") generated by a sender computing device for encrypting a message located at the sender computing device, the message to be passed between the sender computing device and a recipient computing device; encrypt the MEK using a guard key located at the first intermediary to produce an encrypted version of the MEK; send the encrypted version of the MEK to the sender computing device for inclusion with the message; receive the encrypted version of the MEK from the recipient computing device; decrypt the encrypted MEK using the guard key located at the first intermediary to produce a decrypted version of the MEK; and send the decrypted version of the MEK to the recipient computing device for decrypting the message. The system further includes a second intermediary including a second memory and at least one second processor coupled to the second memory, where the second intermediary is separate, independent, and distinct from the first intermediary and configured to receive, from the sender computing device, the encrypted version of the MEK and the message encrypted by the sender computing device using the MEK; receive a request to transmit the encrypted message and the encrypted version of the MEK to the recipient computing device; and send, to the recipient computing device, the encrypted version of the MEK and the message encrypted by the sender computing device using the MEK. In some cases, first intermediary is further configured to digitally sign the encrypted version of the MEK and a recipient identifier ("RID") associated with the recipient computing device. In some cases, the first intermediary is further configured to receive the digitally signed and encrypted version of the MEK from the recipient, and to verify that the recipient is authorized to request decryption of the encrypted version of the MEK based on the RID prior to decrypting the encrypted MEK. In some cases, the first intermediary is further configured to verify that the sender computing device is authorized to request encryption of the MEK in response to receiving the MEK from the sender computing device. In some cases, the sender computing device is configured to encrypt a message using the MEK, and the recipient computing device is configured to decrypt the message using the decrypted MEK. In some cases, the MEK is encrypted using a symmetric encryption process.

Other aspects, examples, and advantages of these aspects and examples, are discussed in detail below. It will be understood that the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

General Overview

As noted above, intermediaries can be used to convey messages from a sender to a recipient where the recipient is unavailable to receive a message directly from the sender. However, while techniques that make use of intermediaries can be effective in highly controlled environments, their use is nevertheless vulnerable to attacks that seek to circumvent established security measures and to exploit weaknesses and vulnerabilities in their implementation. These techniques also have a high degree of cost and complexity when implemented at a large scale due to the need to establish the trusted relationships at the intermediaries or to create, maintain, and exchange many encryption/decryption keys among the entities.

To this end, techniques that overcome these vulnerabilities, costs, and complexities are provided for secure message passing using semi-trusted intermediaries. In accordance with an embodiment of the present disclosure, a computing device hosting as a sender process has a clear (non-encrypted) message to pass, send, or otherwise transmit to another computing device hosting a recipient process. The sender generates a symmetric message encryption key (MEK) for encrypting the message and sends the MEK to a first intermediary process with a request for the first intermediary to encrypt the MEK. The sender also includes, in the request, a recipient identifier (RID) uniquely associated with the recipient. The RID can, for example, include any unique identifier within an authentication realm used by the system. For example, in Microsoft Active Directory, the RID is a Security Identifier (SID). In some authentication systems, the RID can be a user or a service identifier, or any other values that can be used to uniquely identify the recipient of the message. The first intermediary verifies that the sender is authorized to request key encryption. The first intermediary has its own key, also referred to as a guard key, which is used to generate an encrypted version of the MEK (that is, to encrypt the original MEK) and an encrypted version of the RID (that is, to encrypt the original RID). The combination of the encrypted MEK and encrypted RID can be signed together by the first intermediary for additional security so that the first intermediary can subsequently verify that the encrypted MEK and RID were previously processed by the first intermediary. The first intermediary returns the encrypted/signed MEK/RID back to the sender. Next, the sender uses the originally generated (non-encrypted) MEK to encrypt the message. The sender then sends the encrypted message, the RID, and the encrypted/signed MEK/RID to a second intermediary process (for example, a message repository), which verifies that the sender is authorized to send messages and retains the data for the recipient. The second intermediary process uses the RID to identify the intended recipient of the message. In some embodiments, the second intermediary can notify or otherwise inform the recipient to notify the recipient (and optionally the sender) that the message is available to retrieve. Next, the recipient attempts to retrieve the encrypted message and the encrypted/signed MEK/RID from the second intermediary. The recipient can use any suitable technique for retrieving the encrypted message. For example, the recipient can poll the second intermediary on a periodic or non-periodic basis to request delivery of any messages that the second intermediary is retaining on behalf of the recipient. When the recipient attempts to retrieve the encrypted message, the second intermediary verifies that the recipient identity matches the RID and authorizes the request. The recipient receives the encrypted message and the encrypted/signed MEK/RID from the second intermediary and requests decryption of the encrypted MEK from the first intermediary. The first intermediary verifies that the combined encrypted MEK/RID was signed by the first intermediary and that the recipient identity matches the RID and then decrypts the MEK and returns it to the recipient. Finally, the recipient decrypts the message using the MEK. The first and second intermediaries are considered semi-trusted because neither is trusted to store or process an unencrypted message, but they are trusted to reliably encrypt keys, store encrypted messages, and only allow access to the designated senders and recipients.

Embodiments of the present disclosure use symmetric encryption and separation of the intermediaries to provide a simple, low cost, and high-performance option that increases security while preserving simplicity, as compared to a fully trusted intermediary, and decreases complexity without sacrificing security, as compared to encrypting messages with asymmetric keys for each recipient. Message confidentiality is maintained by encrypting the message at the sender and decrypting the message at the recipient—only the sender and the recipient have access to the clear, unencrypted message. In certain embodiments, at least two semi-trusted intermediaries are used—one for key encryption/decryption, and one for message and key passing. Since there are at least two intermediaries, an attack on one of them by an attacker will not result in a breach. Furthermore, because the intermediaries are separate, independent, and distinct, an infrastructure owner will be afforded additional time to detect and address an active attack before both intermediaries are compromised. However, despite having at least two intermediaries, there is no requirement for two persistent data stores because the first intermediary is stateless. In other words, the first intermediary does not store any data that it receives or generates as part of the secure message passing process. Rather, the first intermediary holds a single "guard" key that is used by the first intermediary to encrypt and decrypt a message encryption key that is used by the sender to encrypt the message and by the recipient to decrypt the message. The encrypted message encryption key is passed from the sender to the recipient via the second intermediary along with the encrypted message. This means that deployment cost and complexity are comparable to using a fully trusted intermediary. This reduces the costs and complexities of managing the message encryption key in a large or dynamic environment as compared to a scheme where every sender and recipient is required to have its own public and private encryption key. The disclosed techniques thus avoid such costs and complexities in any size environment.

Embodiments of the present disclosure can be implemented on a wide range of platforms, including Microsoft Windows® or other platforms, such as mobile computing platforms and Internet-of-Things (IoT) devices where low power requirements may restrict usage of asymmetric encryption techniques.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

General Terminology

As used herein, in addition to its plain and ordinary meaning, the term "message" refers to any data or information that is sent, passed, or otherwise transmitted from one computing service, device, or computer-implemented process to another by any means of transmission, such as electronically, optically, acoustically, electromagnetically, or using any other suitable type of communications.

As used herein, in addition to its plain and ordinary meaning, the term "sender" refers to any computer-implemented process with a unique, verifiable identity, such as a sender of a message to one or more recipients. For example, the sender can be associated with a user or a computing device used to send and receive messages.

As used herein, in addition to its plain and ordinary meaning, the terms "encryption" and "decryption," respectively, refer to any process or processes that transform a message or other data into or out of a form that is unintelligible. For example, an encrypted message is a message that is unintelligible, while a decrypted message is intelligible, without additional transformation, to at least one entity.

As used herein, in addition to its plain and ordinary meaning, the term "recipient" refers to any computer-implemented process with a unique, verifiable identity, such as a recipient of a message passed from another entity (e.g., a sender). The recipient can be associated with a user or a computing device used to send and receive messages.

As used herein, in addition to its plain and ordinary meaning, the term "intermediary" refers to an agent located along the transmission path of a message between the sender and the recipient of the message. The intermediary is, in some embodiments, a computer-implemented process that acts as an authorization authority to verify that the sender and the recipient are authorized to access the services provided by the intermediaries.

It should be noted that, in some embodiments, one or more of the processes described herein (e.g., the sender, the recipient, and the intermediaries) can each implement and expose an application program interface (API) configured to receive and respond to calls from one another. For instance, the intermediaries can each implement and expose an API configured to receive and respond to calls from the sender and the recipient. These APIs enable the processes to interoperate, in some embodiments. Further, in some embodiments, one or more of the processes described above can each include local storage allocated for the private use of the process.

Process Overview

As noted above, there are at least two common techniques of secure message passing between two or more computer-implemented processes that utilize intermediaries. These techniques include using trusted intermediaries to convey the message and encrypting at a message to prevent unauthorized access to the data. While these techniques are effective in controlled environments, they are also vulnerable to attacks by entities seeking to circumvent the security measures and to exploit weaknesses and vulnerabilities in their implementation. For instance, in one example, a trusted intermediary is an agent located between the sender and the recipient of a message. The trusted intermediary conveys a clear-text message between entities. However, securing a large number of clear-text messages at rest (i.e., in storage) and during processing is expensive. Also, the intermediary must itself be secured from attacks that could compromise data stored with the intermediary, such as the clear-text messages, which creates a very valuable target to breach as all such messages will be available for the attacker once the trusted intermediary is breached. Encryption provides security but introduces other costs and complexities resulting from the difficulty of distributing and managing the keys used for encrypting and decrypting a message in a large-scale environment.

In accordance with various embodiments of the present disclosure, it will be understood that one or more secure communication channels exist or can be created between processes exchanging messages, such as from a sender to a recipient, using existing techniques. Furthermore, it will be understood that all processes, including the sender, the recipient, and any intermediaries, can be configured to reliably authenticate the identity of other processes using existing techniques. As noted above, one or more intermediaries can be used to pass messages from the sender to the recipient when the recipient is unreachable directly from the sender. The use of intermediaries for message passing, in accordance with certain embodiments, is useful because neither the sender nor the recipient is directly reachable from one another or not always available. The intermediaries provide a "man in the middle" that is reliably available for the sender to send messages to it and to retain the message until the recipient is available and ready to receive the message.

Figure 1:
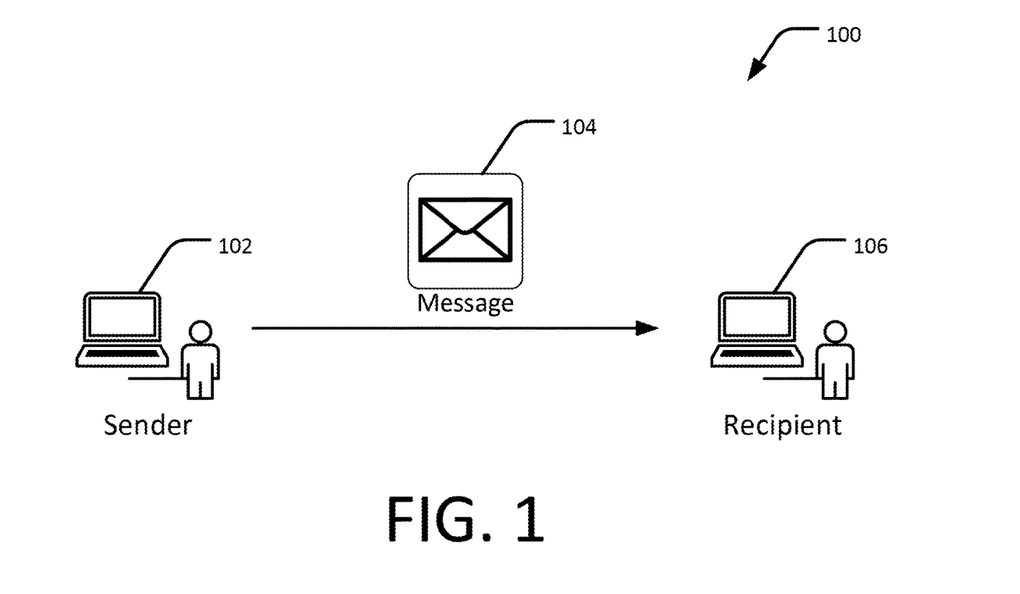
FIG. 1 is a schematic diagram of an example message passing process, in accordance with an embodiment of the present disclosure.

FIG. 1 is a schematic diagram of an example message passing process 100, in accordance with an embodiment of the present disclosure. A sender process ("sender") 102 sends a message 104 directly to a recipient process ("recipient") 106 by passing the message 104 to the recipient 106. The message 104 can include, for example, sensitive or confidential information that is intended only for receipt by the recipient 106. The sender 102 is separate, independent, and distinct from the recipient 106 (i.e., the sender 102 and the recipient 106 are implemented by at least two different threads). For example, the sender 102 and the recipient 106 can be implemented on physically different computing devices or servers having different network addresses and separate processing and data storage environments. In some cases, the sender 102 and the recipient 106 can be physically or logically isolated from each other, for example, using a network firewall or other suitable security devices for preventing or limiting the exchange of data between the sender 102 and the recipient 106.

In this configuration, there is no intermediary between the sender 102 and the recipient 106. The recipient 106 must be reachable and able to receive the message 104 directly from the sender 102. However, in some cases the recipient 106 may be offline or otherwise unavailable to receive the message 102. In such cases the process 100 is not suitable for message passing.

Figure 2:
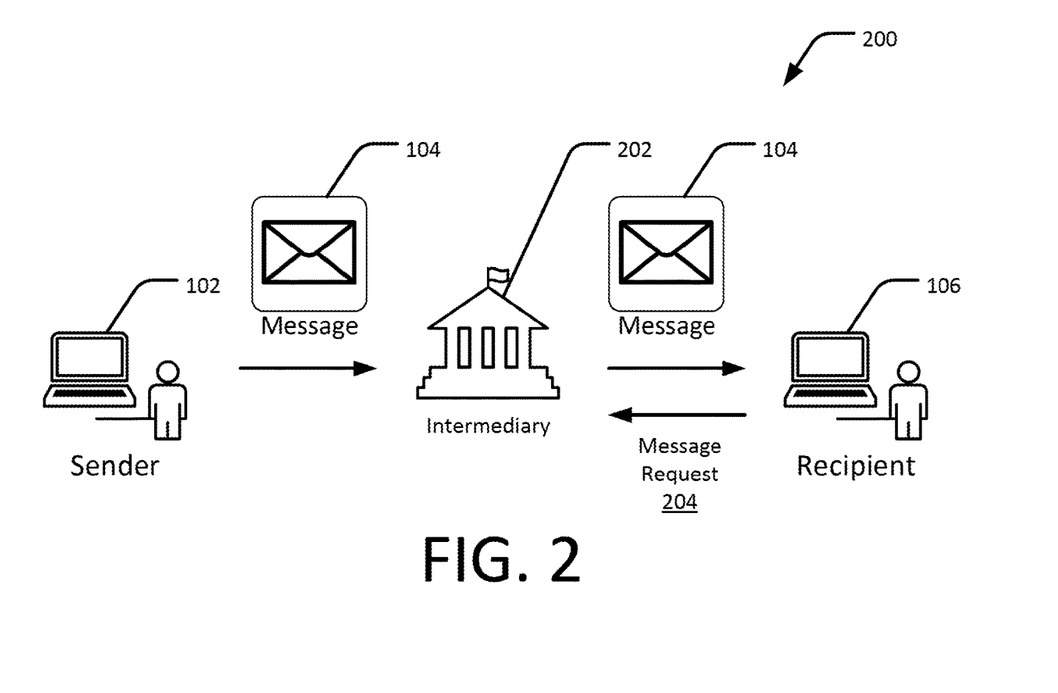
FIG. 2 is a schematic diagram of another example message passing process, in accordance with an embodiment of the present disclosure.

FIG. 2 is a schematic diagram of another example message passing process 200, in accordance with an embodiment of the present disclosure. In this configuration, an intermediary process ("intermediary") 202 is located between a sender 102 and a recipient 106. The sender 102 passes the message 104 to the intermediary 202 along with a recipient identifier that is associated with the recipient 106. The intermediary 202 receives the message 104 from the sender 102 and retains the message 104 until the recipient 106 sends a message request 204 to the intermediary 202. The recipient 106 can, for example, send the message request 204 to the intermediary 202 when the recipient 106 expects to receive the message 104 or at any other time when the recipient 106 polls the intermediary 202 for messages (for example, polling at certain time intervals or in response to certain events, such as power-up, authentication to a domain controller, etc.). The intermediary 202 replies to the message request 204 by passing the message 104 to the recipient 106 if the identity of the recipient 106 matches the recipient identifier.

The process 200 addresses some of the limitations of the process 100. For example, using the process 200, the recipient 106 does not need to be reachable from the sender 102 because the intermediary 202 retains the message 104 until the recipient 106 retrieves it.

Figure 3:
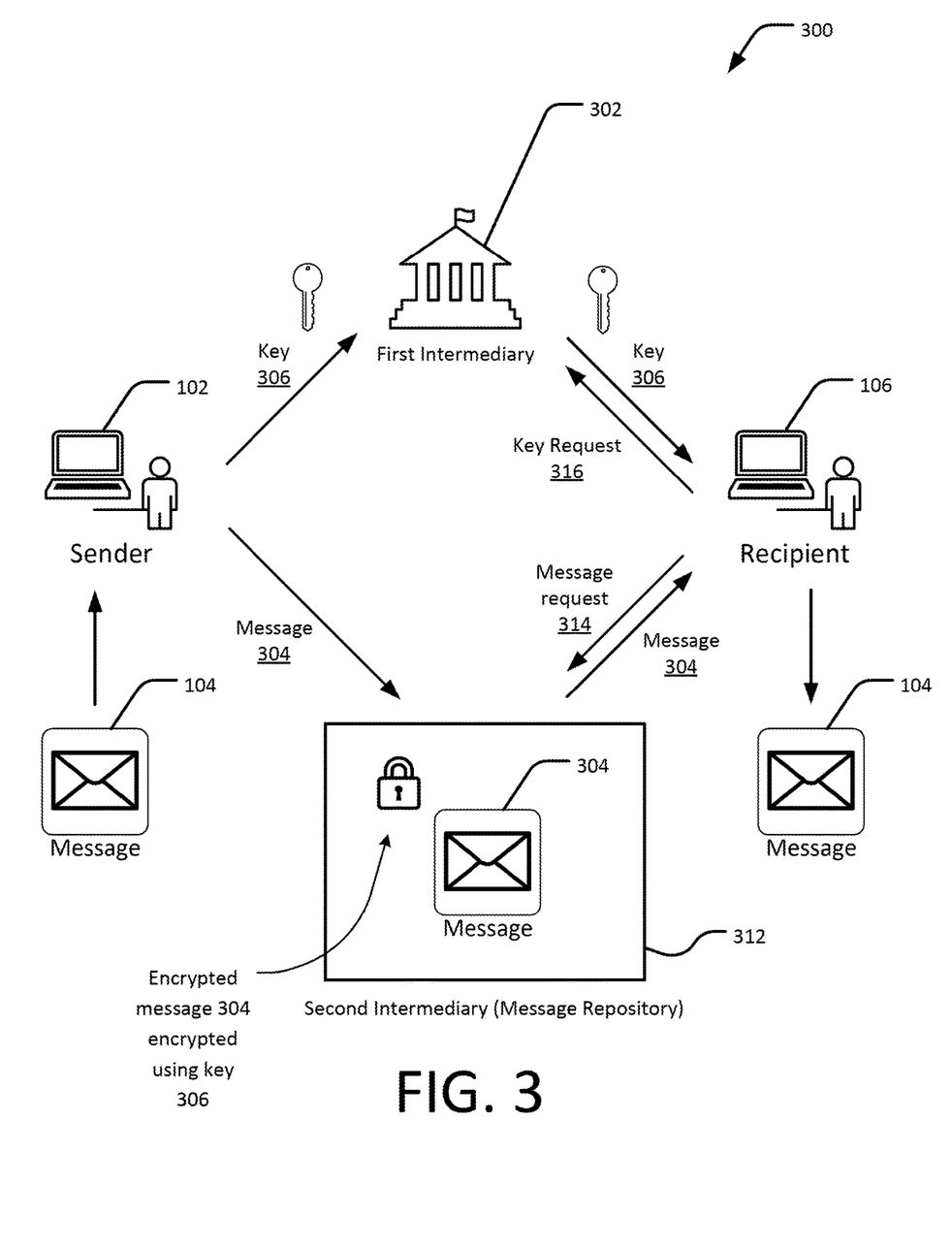
FIG. 3 is a schematic diagram of yet another example message passing process, in accordance with an embodiment of the present disclosure.

FIG. 3 is a schematic diagram of yet another example message passing process 300, in accordance with an embodiment of the present disclosure. In this configuration, at least two intermediaries (e.g., a first intermediary 302 and a second intermediary 312) are located between the sender 102 and the recipient 106. The sender 102 encrypts or otherwise secures the message 104 using a message encryption key 306 to produce an encrypted (locked) message 304. The sender 102 sends the key 306 to the first intermediary 302, which stores the key 306. The sender 102 separately passes the encrypted message 304 to the second intermediary 312. The second intermediary 312 retains the message 304 until it receives a request 314 for the message 304 from the recipient 106. Upon receiving the message request 314, the second intermediary 312 passes the encrypted message 104 to the recipient 106. The key 306, which is stored at the first intermediary 302, is passed to the recipient 106 from the first intermediary 302 in response to a key request 316 from the recipient 106. The key 306 is then used by the recipient 106 to decrypt (unlock) the encrypted message 304.

According to some embodiments, the key 306 for encrypting and decrypting the message 104 can, for example, include a random string of bits generated specifically to scramble and/or unscramble data. Such keys can be created using processes designed to ensure that each key is unique and unpredictable. For example, 256-bit Advanced Encryption Standard (AES) keys can be used to encrypt the message 104. However, it will be understood that any suitable encryption process can be used, including symmetric processes and asymmetric processes. Symmetric, or secret key encryption, uses a single key for both encryption and decryption. Symmetric key encryption is used for encrypting large amounts of data efficiently. 256-bit AES keys are symmetric keys. Asymmetric, or public/private encryption, uses a pair of keys. Data encrypted with one key are decrypted only with the other key in the public/private key pair. When an asymmetric key pair is generated, the public key is typically used to encrypt, and the private key is typically used to decrypt.

As described above, the first intermediary 302 serves as an agent for exchanging the key 306 between the sender 102 and the recipient 106 in a similar manner as the intermediary 202 serves as an agent for exchanging the message 104 between the sender 102 and the recipient 106 in the process 200 of FIG. 2. However, as noted above, instead of receiving the message 104 from the sender 102, the sender 102 passes the key 306 to the first intermediary 302 without the message 104. The encrypted message 304 is instead passed from the sender 102 to the recipient 106 via the second intermediary 312 (e.g., a message repository organized to store messages and metadata descriptive of the messages), which retains the encrypted message 304 until the recipient 106 requests delivery. The unencrypted message 104 is not passed at all. In this manner, the first intermediary 302 does not have access to either the original, unencrypted message 104 or the encrypted message 304.

Note that because the first intermediary 302 does not possess the encrypted message 304, the key 306 alone is useless for accessing the information in the message 304. This provides an additional layer of protection against an attack of the first intermediary 302. In other respects, while the process 300 solves the security problem, there are additional cost and management complexities associated with storing and transferring separate encryption keys from the sender(s) 102 to the recipient(s) 106 for each message (for many messages, at scale, this can incur high storage and processing costs).

Example Secure Message Passing Methodology

Figure 4:
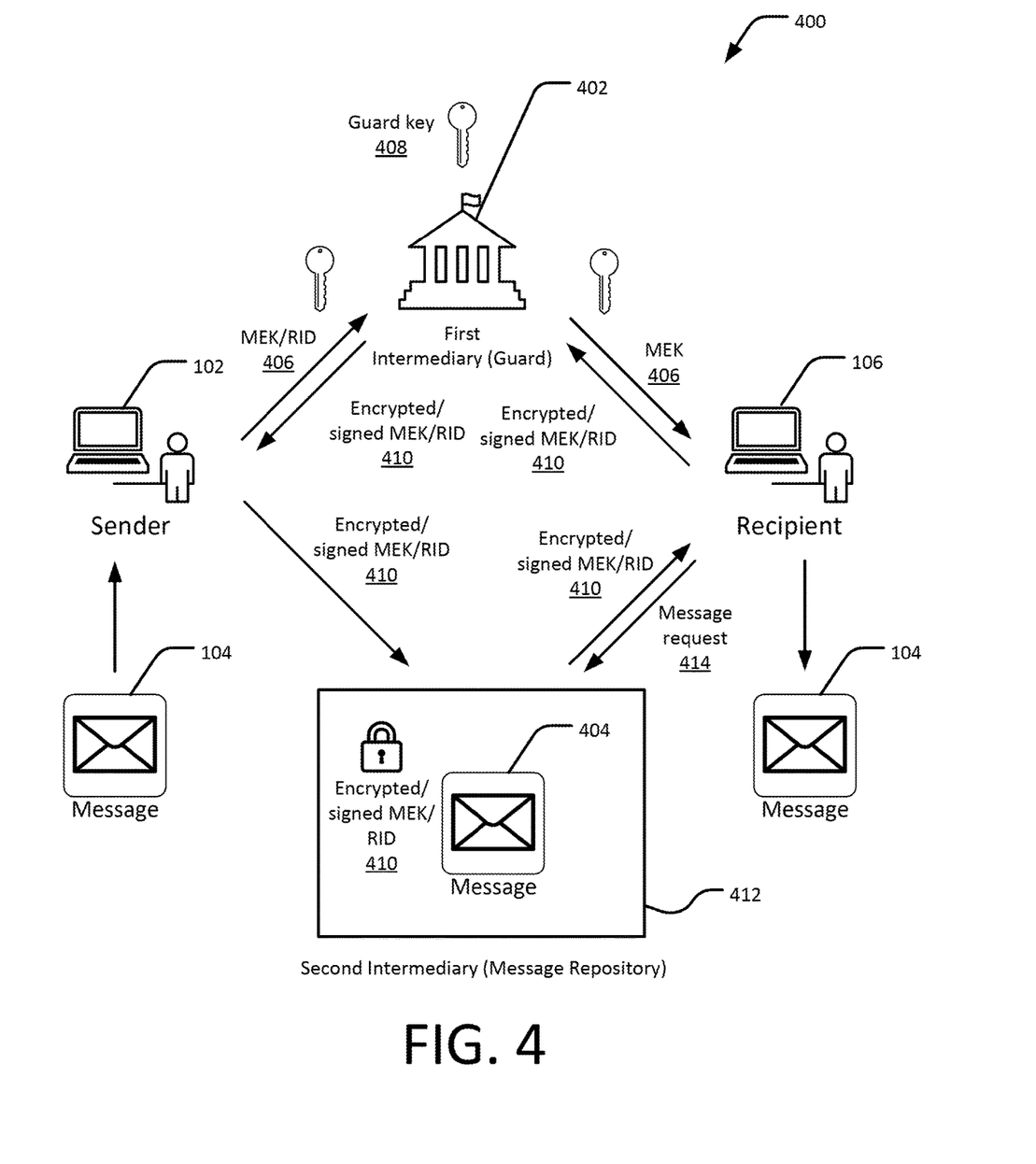
FIG. 4 is a schematic diagram of an example secure message passing process, in accordance with an embodiment of the present disclosure.

FIG. 4 is a schematic diagram of an example secure message passing process 400, in accordance with an embodiment of the present disclosure. In this configuration, at least two intermediaries (e.g., a first intermediary 402 and a second intermediary 412) are located between the sender 102 and the recipient 106. Here, the process for encrypting and decrypting the message 104 is different from the process 300 in that the first intermediary 402 does not retain the encryption key generated by the sender 102 for encrypting the message 104. Rather, the first intermediary 402 holds a separate "guard" key 408 that is used to encrypt a symmetric message encryption key (MEK) 406, which is generated by the sender 102, as will now be described in further detail. Initially, the sender 102 generates the MEK 406 and passes it to the first intermediary 402 along with a request for the first intermediary 402 to encrypt the MEK 406. Any suitable technique can be used to generate the MEK 406. For example, the MEK 406 can be randomly generated using a random number generator or pseudorandom number generator. In another example, the MEK 406 can be generated using a passphrase as a hash value and a cryptographic hash function that converts the passphrase into the MEK 406. The sender 102 also includes a recipient identifier (RID) associated with the recipient 106 with the MEK 406. The RID can, for example, include an identifier that is unique to the recipient 106. The first intermediary 402 then verifies that the sender 102 is authorized to request encryption of the MEK 406. For example, the first intermediary 402 can be configured as, or can access, an authorization authority, where the sender 102 is trusted through a separate process.

Once the first intermediary 402 verifies that the sender 102 is authorized to request encryption of the MEK 406, the first intermediary 402 encrypts the MEK 406 using the guard key 408 located at the first intermediary 402. The guard key 408 is unique from other keys in that the guard key 408 is held only by the first intermediary 402 and is not shared with any other entity. This is important because only the first intermediary 402 can decrypt the MEK 406 once it has been encrypted. In encrypted form, the MEK is not usable as a key for decrypting data, such as the message 104, that has been encrypted using the original (unencrypted) MEK. In some embodiments, the first intermediary 402 also encrypts the RID. The combination of the encrypted MEK and the RID (which is encrypted in certain embodiments and not encrypted in certain other embodiments) are digitally signed together by the first intermediary 402 to generate an encrypted/signed MEK/RID 410 and sent back to the sender 102. The first intermediary 402 does not retain the MEK, the encrypted MEK, the RID, or the encrypted/signed MEK/RID 410 after the encrypted/signed MEK/RID 410 is sent back to the sender 102. The sender 102 then encrypts the message 104, located at the sender 102, using the original, non-encrypted MEK 406 to produce an encrypted (locked) message 404. For example, a 256-bit AES process can be used to encrypt the message 104 using the MEK 406. Note that the sender 102 does not share the original, non-encrypted MEK 406 with any entity other than the first intermediary 402.

The sender 102 then passes the encrypted message 404 and the encrypted/signed MEK/RID 410 to the second intermediary 412. The second intermediary 412 is separate, independent, and distinct from the first intermediary 402 (i.e., the first intermediary 402 and the second intermediary 412 are implemented by at least two different execution environments). For example, the first intermediary 402 and the second intermediary 412 can be implemented on physically different servers having different network addresses and separate processing and data storage environments. In some cases, the first intermediary 402 and the second intermediary 412 can be physically or logically isolated from each other, for example, using a network firewall or other suitable security devices for preventing or limiting the exchange of data between the first intermediary 402 and the second intermediary 412.

The second intermediary 412 then verifies that the sender 102 is authorized to pass the encrypted message 404. For example, the second intermediary 412 can be configured as, or can access, an authorization authority, where the sender 102 is trusted through a separate process. If the sender 102 is not authorized to pass the encrypted message 404, then the second intermediary 412 deletes or otherwise disposes of the encrypted message 404. Once the second intermediary 412 verifies that the sender 102 is authorized to pass the encrypted message 404, the second intermediary 412 retains the encrypted message 404. The second intermediary 412 cannot decrypt the encrypted message 404 because the second intermediary 412 does not have access to the unencrypted MEK 406 and cannot gain access to the unencrypted MEK 406 since the identity of the second intermediary 412 does not match the RID of the recipient 106. Furthermore, the first intermediary 402 can be configured to refuse any decryption request from the second intermediary 412 or from any entity other than the one with a matching RID (such as the recipient 106) to provide a decryption key, thereby further preventing the second intermediary 412 from decrypting the encrypted message 404.

Next, the recipient 106 sends a message request 414 to the second intermediary 412, thereby requesting the second intermediary 412 to pass the encrypted message 404 and the encrypted/signed MEK/RID 410 to the recipient 106. The recipient 106 can generate and send the request message 414 in response to any of a variety of events. For example, the recipient 106 can poll the second intermediary 412 on a periodic or non-periodic basis to request delivery of any messages that the second intermediary 412 is retaining on behalf of the recipient 106. The second intermediary 412 then verifies, using the RID, that the recipient 106 is authorized to receive the encrypted message 404. For example, as noted above, the second intermediary 412 can be configured as, of can access, an authorization authority, where the recipient 106 is trusted through a separate process. Note that in some embodiments the RID is not necessarily used. However, use of the RID or other identifying information helps ensure that the entity requesting delivery of the message (e.g., the recipient 106) is authorized to receive the message.

Once the second intermediary 412 verifies that the recipient 106 is authorized to receive the encrypted message 404, the second intermediary 412 passes the encrypted message 404 and the encrypted/signed MEK/RID 410 to the recipient 106. The encrypted message 404 and the encrypted/signed MEK/RID 410 can be passed together or separately. Note that both the encrypted message 404 and the encrypted/signed MEK/RID 410 are needed; without the encrypted/signed MEK/RID 410, the encrypted message 404 cannot be decrypted, and without the encrypted message 404, the encrypted/signed MEK/RID 410 are not useable to obtain the message.

Next, the recipient 106 sends the encrypted/signed MEK/RID 410 to the first intermediary 402 along with a request for the first intermediary 402 to decrypt the encrypted MEK. The recipient 106 also includes the RID in the decryption request to the first intermediary 402. The first intermediary 402 then verifies that the recipient 106 is authorized to request decryption of the encrypted MEK and that the RID matches the RID of the recipient 106. For example, as noted above, the first intermediary 402 can be configured as, or can access, an authorization authority, where the recipient 106 is trusted through a separate process. In some embodiments, the first intermediary 402 also verifies that the combination of the encrypted MEK and RID was previously signed by the first intermediary as an anti-tampering measure.

Once the first intermediary 402 verifies that the recipient 106 is authorized to request decryption of the encrypted MEK and that the RID matches the RID of the recipient 106, the first intermediary 402 decrypts the encrypted MEK using the guard key 408, which as noted above is held only by the first intermediary 402 and is not shared with any other entity. The decrypted MEK 406 is then passed to the recipient 106. The recipient 106 then decrypts the encrypted message 404 using the decrypted MEK 406 to produce the decrypted (unlocked) message 104.

According to some embodiments, the MEK 406 and the encrypted/signed MEK/RID 410 can, for example, include a random string of bits generated specifically to scramble and/or unscramble data. Such keys can be created using processes designed to ensure that each key is unique and unpredictable. For example, 256-bit AES process keys can be used to encrypt the message 104. However, it will be understood that any suitable encryption process can be used, including symmetric encryption/decryption processes and asymmetric encryption/decryption processes. It will also be understood that the process 400 can be implemented with any number of senders, recipients, and intermediaries. For example, one sender can use the process 400 to pass messages to multiple recipients. Similarly, multiple senders can use the process 400 to pass messages to a single recipient. Other embodiments and variations will be apparent in light of this disclosure.

Example Data Flow

Figure 5:
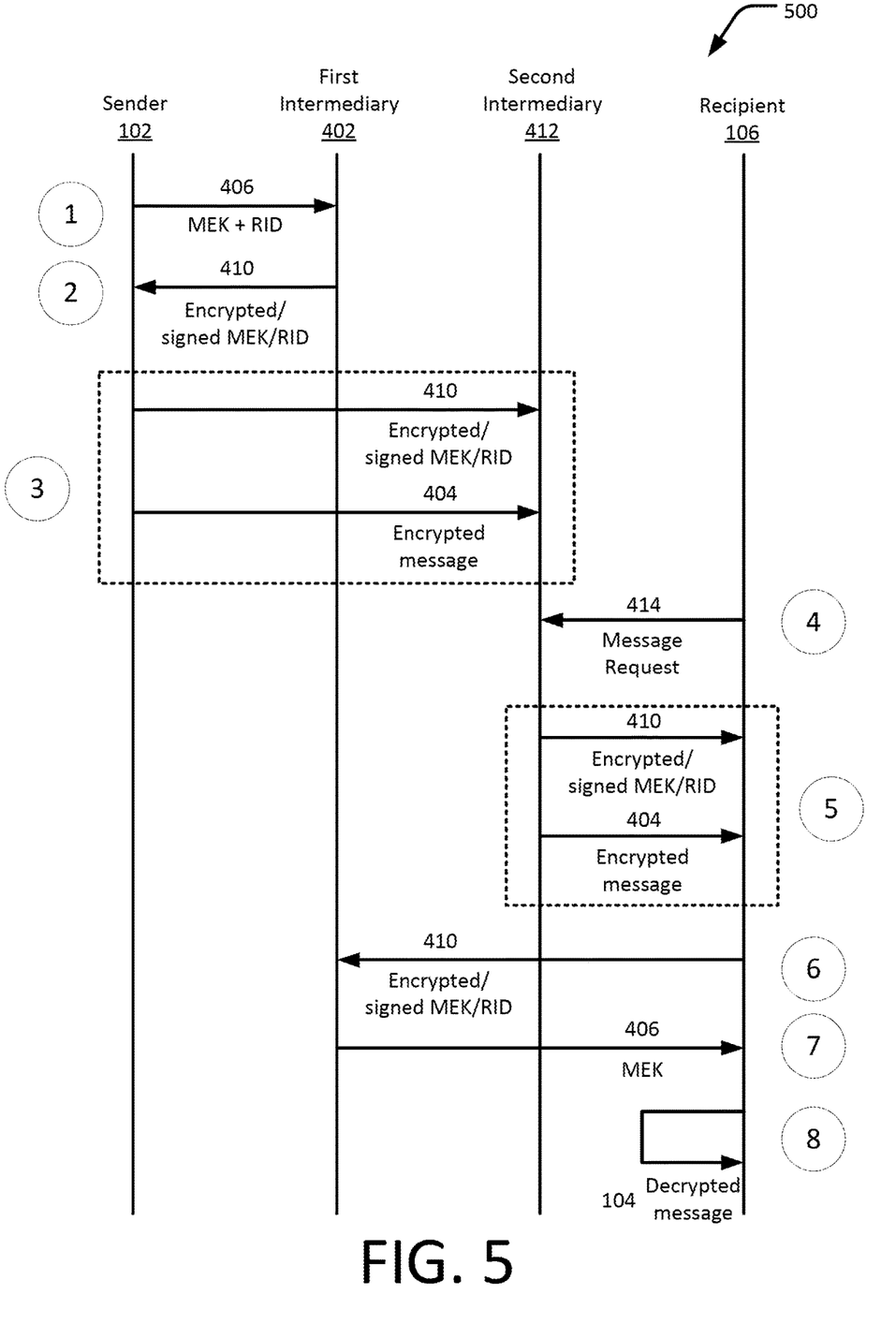
FIG. 5 is a data flow diagram corresponding to the example secure message passing process of FIG. 4.

FIG. 5 is a data flow diagram 500 corresponding to the example secure message passing process 400 of FIG. 4, in accordance with an embodiment of the present disclosure. With reference to FIG. 5:

(1) As discussed above, initially the sender 102 generates the symmetric message encryption key (MEK) 406 and sends it to a first intermediary 402 along with a request for the first intermediary 402 to encrypt the MEK 406. The sender 102 also includes a recipient identifier (RID) associated with the recipient in the request to the first intermediary 402. The first intermediary 402 then verifies that the sender 102 is authorized to request encryption of the MEK 406.

(2) Once the first intermediary 402 verifies that the sender 102 is authorized to request encryption of the MEK 406, the first intermediary encrypts the MEK 406 to generate the encrypted MEK. The encrypted combination of the encrypted MEK and the RID are signed by the first intermediary to generate the encrypted/signed MEK/RID and sent back to the sender 102. The sender 102 then encrypts the message 104 using the non-encrypted (original) MEK 406 to produce an encrypted (locked) message 404.

(3) The sender 102 then passes the encrypted message 404 and the encrypted/signed MEK/RID 410 to a second intermediary 412. Note that the second intermediary 412 receives the encrypted message 404 and the encrypted/signed MEK/RID 410, while the first intermediary 402 never receives or otherwise has any access to either the non-encrypted message 104 or the encrypted message 404. This prevents any attack on the first intermediary 402 from accessing the message in either clear or encrypted form. Next, the second intermediary 412 verifies that the sender 102 is authorized to pass the encrypted message 404. Once the second intermediary 412 verifies that the sender 102 is authorized to pass the encrypted message 404, the second intermediary 412 retains the encrypted message 404 and the encrypted/signed MEK/RID 410.

(4) Next, the recipient 106 requests 414 the encrypted message 404 and the encrypted/signed MEK/RID 410 from the second intermediary 412.

(5) The second intermediary 412 then verifies, using the RID, that the recipient 106 is authorized to receive the encrypted message 404. Once the second intermediary 412 verifies that the recipient 106 is authorized to receive the encrypted message 404, the second intermediary 412 passes the encrypted message 404 and the encrypted/signed MEK/RID 410 to the recipient 106.

(6) Next, the recipient 106 sends the encrypted/signed MEK/RID 410 to the first intermediary 402 along with a request for the first intermediary 402 to decrypt the encrypted MEK. The first intermediary 402 then verifies that the recipient 106 is authorized to request decryption of the encrypted MEK, that the RID matches the RID of the recipient 106, and that the combination of the encrypted MEK and RID was previously signed by the first intermediary 402.

(7) Once the first intermediary 402 verifies that the recipient 106 is authorized to request decryption of the encrypted MEK, that the RID matches the RID of the recipient 106, and that the combination of the encrypted MEK and RID was previously signed by the first intermediary 402, the first intermediary 402 decrypts the encrypted MEK. The decrypted MEK 406 is then passed to the recipient 106.

(8) The recipient 106 then decrypts the encrypted message 404 using the decrypted MEK 406 to produce the decrypted (unlocked) message 104.

Example Methodology

Figure 6:
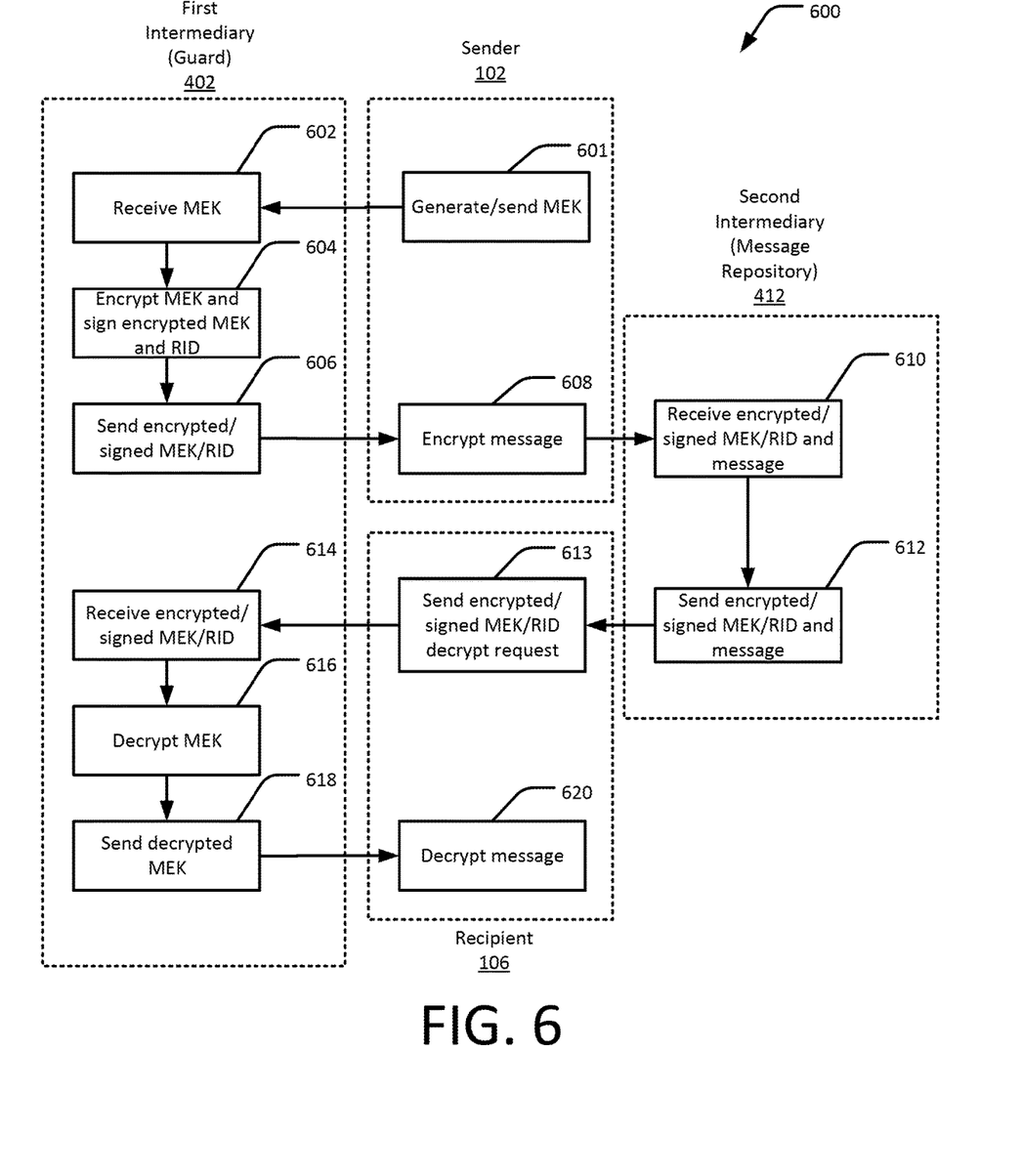
FIG. 6 is a flow diagram for an example secure message passing process, in accordance with an embodiment of the present disclosure.

FIG. 6 is a flow diagram for an example secure message passing process 600, in accordance with an embodiment of the present disclosure. Initially a computer-implemented process acting as a sender (e.g., the sender 102 of FIG. 4) generates 601 a symmetric message encryption key (MEK) and sends it to another computer-implemented process acting as a guard (e.g., the first intermediary (guard) 402 of FIG. 4) along with a request for the guard to encrypt the MEK. The method 600 includes receiving 602, by the guard, the MEK. In some embodiments, receiving 602 the MEK further includes receiving a recipient identifier (RID) associated with another computer-implemented process identified by the sender as a recipient (the recipient 106 of FIG. 4). The RID can, for example, include any set of values that can be used to uniquely identify the recipient. The guard verifies that the sender is authorized to request encryption of the MEK. The method 600 further includes encrypting 604, by the MEK using a key accessible only to the guard. In some embodiments, the combination of the encrypted MEK and the RID is signed 604 by the guard using the guard key to generate an encrypted/signed MEK and RID. The method 600 further includes sending 606, by the guard, the encrypted/signed MEK/RID to the sender.

In some embodiments, the method 600 includes encrypting 608, by the sender, a message using the non-encrypted MEK to produce an encrypted (locked) message. The sender then passes the encrypted message and the encrypted/signed MEK/RID to another computer-implemented process acting as a message repository (e.g., the second intermediary (message repository) 412 of FIG. 4). The method 600 further includes receiving 610, by the message repository, the encrypted message and the encrypted/signed MEK/RID. Note that the message repository receives and retains the encrypted message and the encrypted/signed MEK/RID, while the guard never receives or otherwise has any access to either the non-encrypted message or the encrypted message. This prevents any attack on the guard from accessing the message in either clear or encrypted form. The message repository then verifies that the sender is authorized to pass the encrypted message. Once the message repository verifies that the sender is authorized to pass the encrypted message, the message repository retains the encrypted message.

Next, the recipient requests the encrypted message and the encrypted/signed MEK/RID from the message repository. The message repository then verifies, using the RID, that the recipient is authorized to receive the encrypted message. Once the message repository verifies that the recipient is authorized to receive the encrypted message, the method 600 continues with passing 612, by the message repository, the encrypted message and the encrypted/signed MEK/RID to the recipient.

Next, the recipient sends 613 the encrypted/signed MEK/RID to the guard along with a request for the guard to decrypt the encrypted MEK. The method 600 further includes receiving 614, by the guard, the encrypted MEK. 402. In some embodiments, the guard verifies that the recipient is authorized to request decryption of the encrypted MEK and that the RID matches the RID of the recipient. Once the guard verifies that the recipient is authorized to request decryption of the encrypted MEK, that the RID matches the RID of the recipient, and that the combination of the encrypted MEK and RID was previously signed by the guard, the method 600 continues with decrypting 616, by the guard, the encrypted MEK. The method 600 further includes sending 618, by the guard, the decrypted MEK to the recipient. In some embodiments, the method 600 includes decrypting 620, by the recipient, the encrypted message using the decrypted MEK 406 to produce the decrypted (unlocked) message.

Example Computing Platform

Figure 7:
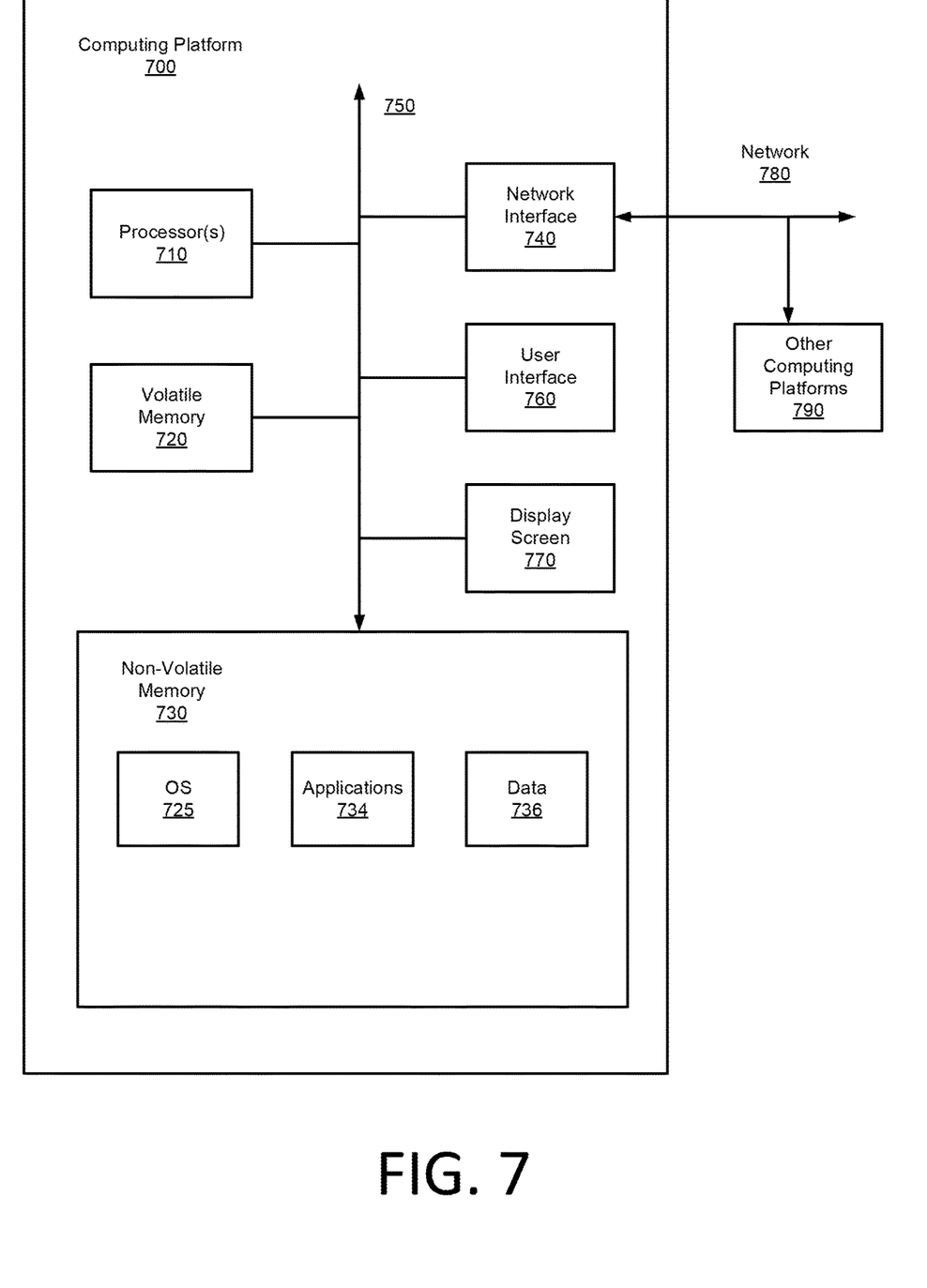
FIG. 7 is a block diagram of a computing platform configured to perform a secure message passing process, in accordance with an example of the present disclosure.

FIG. 7 is a block diagram of a computing platform 700 configured to perform a secure message passing process, in accordance with an example of the present disclosure. In some cases, the platform 700 may be a workstation, a laptop computer, a tablet, a mobile device, or any suitable computing or communication device.

The computing platform or device 700 includes one or more processors 710, volatile memory 720 (e.g., random access memory (RAM)), non-volatile memory 730, one or more network or communication interfaces 740, a user interface (UI) 760, a display screen 770, and a communications bus 750. The computing platform 700 may also be referred to as a computer or a computer system.

The non-volatile (non-transitory) memory 730 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 760 can include one or more input/output (I/O) devices (e.g., a mouse, a keyboard, a microphone, one or more speakers, one or more biometric scanners, one or more environmental sensors, and one or more accelerometers, etc.).

The display screen 770 can provide a graphical user interface (GUI) and in some cases, may be a touchscreen or any other suitable display device.

The non-volatile memory 730 stores an operating system ("OS") 725, one or more applications 734, and data 736 such that, for example, computer instructions of the operating system 725 and the applications 734, are executed by processor(s) 710 out of the volatile memory 720. In some examples, the volatile memory 720 can include one or more types of RAM and/or a cache memory that can offer a faster response time than a main memory. Data can be entered through the user interface 760. Various elements of the computer platform 700 can communicate via the communications bus 750.

The illustrated computing platform 700 is shown merely as an example computing device and can be implemented by any computing or processing environment with any type of machine or set of machines that can have suitable hardware and/or software capable of operating as described herein.

The processor(s) 710 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 710 can be analog, digital or mixed. In some examples, the processor 710 can be one or more physical processors, or one or more virtual (e.g., remotely located or cloud) processors. A processor including multiple processor cores and/or multiple processors can provide functionality for parallel, simultaneous execution of instructions or for parallel, simultaneous execution of one instruction on more than one piece of data.

The network interfaces 740 can include one or more interfaces to enable the computing platform 700 to access a computer network 780 such as a Local Area Network (LAN), a Wide Area Network (WAN), a Personal Area Network (PAN), or the Internet through a variety of wired and/or wireless connections, including cellular connections. In some examples, the network 780 may allow for communication with other computing platforms 790, to enable distributed computing. In some examples, the network 780 may allow for communication with the one or more of the sender 102, the recipient 106, the intermediary 202 or 302, the first intermediary 402, and the second intermediary 412 of FIGS. 1-4.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

What is claimed is:

1. A method comprising:
    receiving, by a first intermediary computing device, a first encryption key generated by a sender computing device for encrypting a message located at the sender computing device,
    wherein the message is passed between the sender computing device and a recipient computing device via a second intermediary computing device that is separate, independent, and distinct from the first intermediary computing device;
    encrypting, by the first intermediary computing device, the first encryption key using a second encryption key located at the first intermediary computing device to produce an encrypted version of the first encryption key;
    sending, by the first intermediary computing device, the encrypted version of the first encryption key to the sender computing device for inclusion with the message;
    receiving, by the first intermediary computing device, the encrypted version of the first encryption key from the recipient computing device;
    decrypting, by the first intermediary computing device, the encrypted version of the first encryption key using the second encryption key located at the first intermediary computing device to produce a decrypted version of the first encryption key; and
    sending, by the first intermediary computing device, the decrypted version of the first encryption key to the recipient computing device for decrypting the message.

2. The method of claim 1, further comprising digitally signing, by the first intermediary computing device, the encrypted version of the first encryption key.

3. The method of claim 2, further comprising
    receiving, by the first intermediary computing device, the digitally signed and the encrypted version of the first encryption key from the recipient computing device, and
    verifying that the recipient computing device is authorized to request decryption of the encrypted version of the first encryption key based on a recipient identifier ("RID") associated with the recipient computing device prior to decrypting the encrypted version of the first encryption key.

4. The method of claim 3, further comprising digitally signing, by the first intermediary computing device, the encrypted version of the first encryption key and the RID.

5. The method of claim 1, further comprising:
    receiving, by the second intermediary computing device and from the sender computing device, the encrypted version of the first encryption key and an encrypted message encrypted using the first encryption key;
    receiving, by the second intermediary computing device, a request to pass the encrypted message and the encrypted version of the first encryption key to the recipient computing device; and passing, by the second intermediary computing device and to the recipient computing device, the encrypted version of the first encryption key and the encrypted message.

6. The method of claim 1, further comprising verifying, by the first intermediary computing device, that the sender computing device is authorized to request encryption of the first encryption key in response to receiving the first encryption key from the sender computing device.

7. The method of claim 1, wherein the first encryption key is encrypted using a symmetric encryption process.

8. The method of claim 1, wherein the first encryption key is encrypted using an asymmetric encryption process.

9. A method comprising:
receiving, by a second intermediary computing device, an encrypted message to be passed between a sender computing device and a recipient computing device, the encrypted message having been encrypted using a first encryption key, and further receiving an encrypted version of the first encryption key encrypted by a first intermediary computing device that is separate, independent, and distinct from the second intermediary computing device;
receiving, by the second intermediary computing device, a request to pass the encrypted message and the encrypted version of the first encryption key to the recipient computing device; and
passing, by the second intermediary computing device, the encrypted message and the encrypted version of the first encryption key to the recipient computing device, the encrypted version of the first encryption key having been encrypted using a second encryption key located at the first intermediary computing device.

10. The method of claim 9, further comprising verifying, by the second intermediary computing device, that the recipient computing device is authorized to request passing of the encrypted message to the recipient computing device based on an identifier associated with the recipient computing device prior to sending the encrypted message to the recipient computing device.

11. The method of claim 10, further comprising:
receiving, by the first intermediary computing device, the first encryption key used by the sender computing device for encrypting the encrypted message;
encrypting, by the first intermediary computing device, the first encryption key using the second encryption key located at the first intermediary computing device to produce the encrypted version of the first encryption key;
sending, by the first intermediary computing device, the encrypted version of the first encryption key to the sender computing device for inclusion with the encrypted message to be passed to the recipient computing device;
receiving, by the first intermediary computing device, the encrypted version of the first encryption key from the recipient computing device subsequent to receipt of the encrypted message from the sender computing device;
decrypting, by the first intermediary computing device, the encrypted version of the first encryption key using the second encryption key to produce a decrypted version of the first encryption key; and
sending, by the first intermediary computing device, the decrypted version of the first encryption key to the recipient computing device for decrypting the encrypted message.

12. The method of claim 11, further comprising receiving, by the first intermediary computing device, the encrypted version of the first encryption key from the recipient computing device, and verifying that the recipient computing device is authorized to request decryption of the encrypted version of the first encryption key based on an recipient identifier (RID) associated with the recipient computing device prior to decrypting the encrypted version of the first encryption key.

13. The method of claim 9, wherein the first encryption key is encrypted using a symmetric encryption process.

14. The method of claim 9, wherein the first encryption key is encrypted using an asymmetric encryption process.

15. A system for secure message passing, the system comprising:
a first intermediary including a first memory and at least one first processor coupled to the first memory,
wherein the first intermediary is configured to
receive a message encryption key ("MEK") generated by a sender computing device for encrypting a message located at the sender computing device,
wherein the message is passed between the sender computing device and a recipient computing device;
encrypt the MEK using a guard key located at the first intermediary to produce an encrypted version of the MEK;
send the encrypted version of the MEK to the sender computing device for inclusion with the message;
receive the encrypted version of the MEK from the recipient computing device;
decrypt the encrypted version of the MEK using the guard key located at the first intermediary to produce a decrypted version of the MEK; and
send the decrypted version of the MEK to the recipient computing device for decrypting the message; and
a second intermediary including a second memory and at least one second processor coupled to the second memory,
wherein the second intermediary is separate, independent, and distinct from the first intermediary and configured to
receive, from the sender computing device, the encrypted version of the MEK and the encrypted version of the message;
receive a request to transmit the encrypted version of the message and the encrypted version of the MEK to the recipient computing device; and
send, to the recipient computing device, the encrypted version of the MEK and the encrypted version of the message.

16. The system of claim 15, wherein the first intermediary is further configured to digitally sign the encrypted version of the MEK and a recipient identifier ("RID") associated with the recipient computing device.

17. The system of claim 16, wherein the first intermediary is further configured
to receive the digitally signed and encrypted version of the MEK from the recipient computing device, and
to verify that the recipient computing device is authorized to request decryption of the encrypted version of the MEK based on the RID prior to decrypting the encrypted MEK.

18. The system of claim 15, wherein the first intermediary is further configured to verify that the sender computing device is authorized to request the first intermediary to encrypt of the MEK in response to receiving the MEK from the sender computing device.

19. The system of claim 15, wherein the sender computing device is configured to encrypt the message using the MEK, and wherein the recipient computing device is configured to decrypt the encrypted version of the message using the decrypted version of the MEK.

20. The system of claim 15, wherein the MEK is encrypted using a symmetric encryption process.

* * * * *